US009286133B2

(12) United States Patent
Dusanapudi et al.

(10) Patent No.: US 9,286,133 B2
(45) Date of Patent: *Mar. 15, 2016

(54) VERIFICATION OF DYNAMIC LOGICAL PARTITIONING

(71) Applicant: GLOBALFOUNDRIES INC., Grand Cayman (KY)

(72) Inventors: Manoj Dusanapudi, Bangalore (IN); Varun Mallikarjunan, Cambridge (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 185 days.

This patent is subject to a terminal disclaimer.

(21) Appl. No.: 14/097,606

(22) Filed: Dec. 5, 2013

(65) Prior Publication Data

US 2015/0095608 A1   Apr. 2, 2015

Related U.S. Application Data

(63) Continuation of application No. 14/042,886, filed on Oct. 1, 2013.

(51) Int. Cl.
*G06F 9/50* (2006.01)
*G06F 3/06* (2006.01)

(52) U.S. Cl.
CPC ............ *G06F 9/5077* (2013.01); *G06F 3/0604* (2013.01); *G06F 3/0629* (2013.01); *G06F 3/0644* (2013.01); *G06F 3/0673* (2013.01)

(58) Field of Classification Search
CPC ....... G06F 9/50; G06F 9/5077; G06F 3/0629; G06F 3/0644; G06F 3/0673
USPC .......................................... 711/154, 170, 173
See application file for complete search history.

(56) References Cited

U.S. PATENT DOCUMENTS

| 6,199,179 | B1 | 3/2001 | Kauffman et al. |
|---|---|---|---|
| 6,438,671 | B1 | 8/2002 | Doing et al. |
| 8,140,816 | B2 | 3/2012 | Hofer et al. |
| 2007/0294065 | A1 | 12/2007 | Gimpl et al. |
| 2008/0115012 | A1 | 5/2008 | Jann et al. |
| 2012/0011513 | A1 | 1/2012 | McConaughy et al. |
| 2012/0131560 | A1 | 5/2012 | Duale et al. |
| 2012/0216214 | A1 | 8/2012 | Flemming et al. |

OTHER PUBLICATIONS

Harris, et al., "LPAR Configuration and Management", Working with IBM @server iSeries Logical Partitions, Redbooks, Apr. 2002, <http://redbooks.ibm.com/redbooks/pdfs/sg246209.pdf>.
Park, et al., "Capacity Planning for Logical Partitioning", on the IBM @server iSeries Server, Redbooks, Oct. 2001, <http://redbooks.ibm.com/redbooks/pdfs/sg246251.pdf>.
U.S. Appl. No. 14/042,886, entitled "Verification of Dynamic Logical Partitioning", filed Oct. 1, 2013.

*Primary Examiner* — Matthew Bradley
(74) *Attorney, Agent, or Firm* — Delio, Peterson & Curcio LLC; Kelly M. Nowak

(57) ABSTRACT

Embodiments of the present invention disclose a method, computer program product, and system for verifying transitions between logical partition configurations. A computer system divides the physical resources of a processing core into logical partitions, each of which has at least one processing subcore. The computer system loads the contexts of the logical partitions and assigns test cases to each processing subcore. The processing subcore executes the test case, verifying the context of the logical partition. The computer system reassigns the test cases to different processing cores in anticipation of reconfiguring the number of logical partitions on the processing core. The computing system reconfigures the number of logical partitions on the processing core and executes the test cases as assigned on the reconfigured logical partitions.

7 Claims, 4 Drawing Sheets

VERIFICATION OF DYNAMIC LOGICAL PARTITIONING

CROSS REFERENCE TO RELATED APPLICATION

This application is a Continuation application of pending U.S. patent application Ser. No. 14/042,886 filed Oct. 1, 2013.

FIELD OF THE INVENTION

The present disclosure relates generally to the field of virtualized computing, and more particularly to on demand logical partitioning of hardware in computing systems.

BACKGROUND OF THE INVENTION

Virtualization is a core component for servers, cloud computing and virtual desktop environments (VDE) and is often used in data centers because it allows flexibility in the provisioning and placement of servers and their associated workloads in the data center. In system virtualization, multiple virtual computing systems or virtual machines are created within a single physical computing system. The physical system may be a stand-alone computer, or alternatively, a computing system utilizing clustered computers and components. Virtual systems, or virtual machines, are independent operating environments that use logical or real divisions of physical resources such as processors, memory, and input/output (I/O) adapters. In some instances, system virtualization is implemented through a managing functionality, typically hypervisor technology. Hypervisors, also referred to as virtual machine managers (VMMs), use a thin layer of code in software or firmware to achieve fine-grained, dynamic resource sharing. Hypervisors are the primary technology for system virtualization because they provide the greatest level of flexibility in how virtual resources are defined and managed.

Logical partitioning is the ability to logically divide a real, or physical, server into two or more independent servers, and execute one or more application in each virtual machine or logical partition (LPAR) as if the virtual machine or LPAR was a separate physical computer. Each virtual system, virtual server, or virtual machine operates like an independent computing system running its own operating system. Operating systems running in a virtualized computing environment are often referred to as "guest machines." Hypervisors can allocate dedicated processors, I/O adapters, and memory to each virtual machine and can also allocate shared processors to each virtual machine. In some manners of virtualization, the hypervisor creates a shared processor pool from which the hypervisor allocates time slices of virtual processors to the virtual machines according to predetermined allocation percentages. In other words, the hypervisor creates virtual processors from physical processors so that virtual machines can share the physical processors, which includes sharing cache space and memory bandwidth, while running independent operating environments.

Some manners of virtualization allow for individual, physical processor cores to be partitioned into multiple LPARs. The method of simultaneous partitioning allows for finer divisions when the hypervisor allocates physical processors to virtual machines, which avoids wasting processing resources by only allocating the necessary resources to a given process. To maximize the method of fine partitioning, a system of dynamic logical partitioning (DLPAR) allows for runtime changes between different LPAR modes on a single processor core depending on workload requirements.

SUMMARY

Embodiments of the present invention disclose a method, computer program product, and system for verifying transitions between logical partition configurations. A computing system divides the physical resources of a processing core into logical partitions, each of which has at least one processing subcore. The computing system loads the contexts of the logical partitions and assigns test cases to each processing subcore. The processing subcore executes the test case, verifying the context of the logical partition. The computing system reassigns the test cases to different processing cores in anticipation of reconfiguring the number of logical partitions on the processing core. The computing system reconfigures the number of logical partitions on the processing core and executes the test cases as assigned on the reconfigured logical partitions.

DETAILED DESCRIPTION

Figure 1:
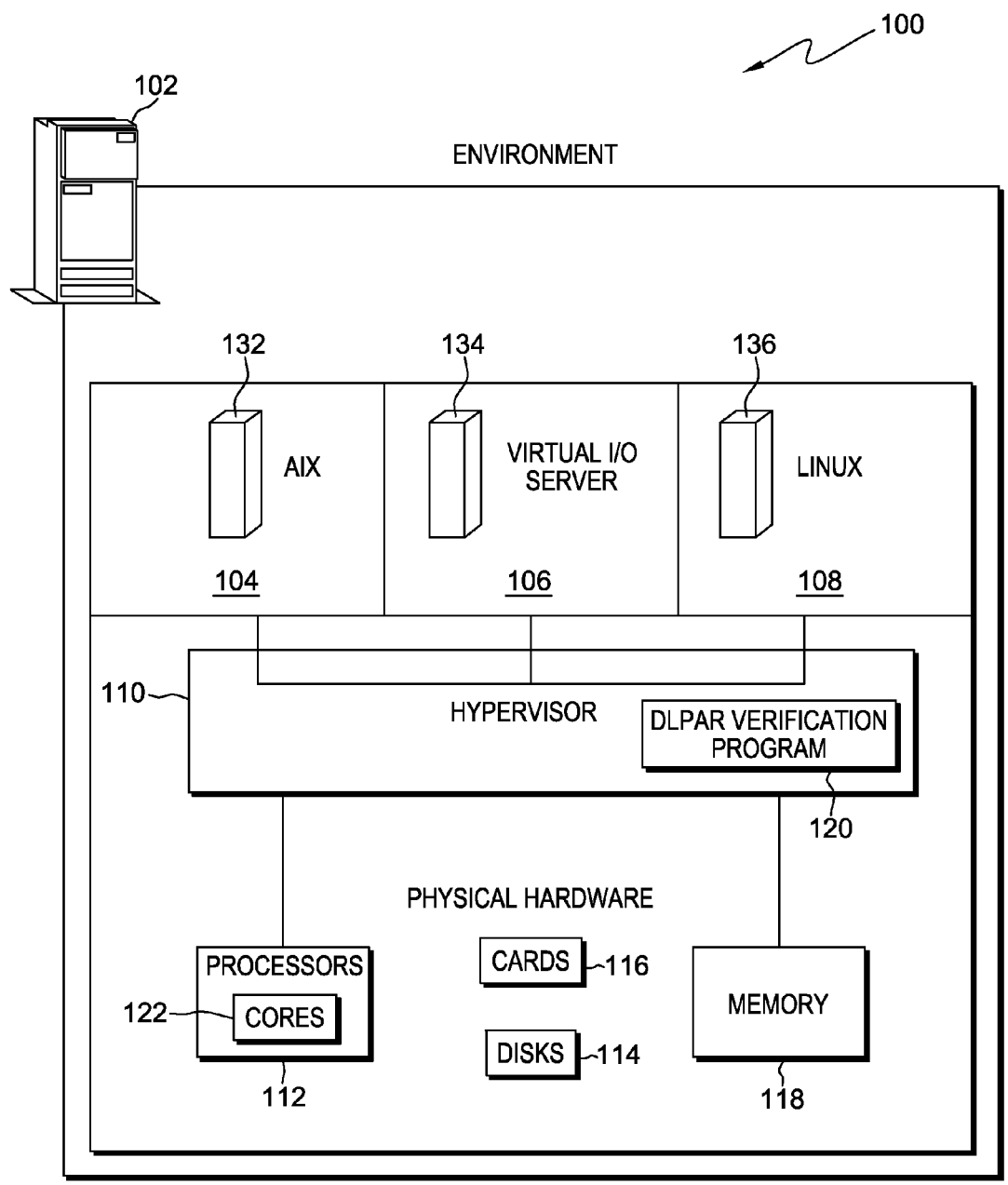
FIG. 1 is a functional block diagram illustrating a virtualized computing environment, in accordance with an embodiment of the present invention.

Embodiments of the present invention recognize that virtualization is an important feature in high-end server microprocessors. An advantage of virtualization is that it allows a physical processor pool to be shared among several operating systems giving each operating system the view that the operating system is the sole user of all the system resources. Advancement in virtualization technology have allowed for partitioning of physical resources on smaller and smaller scales. Dividing the physical resources of the server on small scales helps to prevent wasting server resources by committing more physical resources than is necessary at a given time for a given task.

A feature called dynamic logical partitioning (DLPAR) allows the server to redistribute the physical resources on smaller scales in a runtime environment. However, such reallocations of physical resources increase the risk of the server failing if not properly executed. In order to properly transition to a new LPAR mode, all information from the previous LPAR mode must be removed from the processors. Unless the processors are cleared of all information from the previous partition, the processor will not properly function in the new partition. Embodiments of the present invention provide the capability to test the ability of the hardware to dynamically reallocate the physical resources of the server to different LPAR configurations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by, or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Exemplary embodiments of the present invention will now be described in detail with reference to the Figures. FIG. 1 illustrates a virtualized computing environment, generally designated 100.

Virtualized computing environment 100 includes at least one host computing system, such as host computing system 102. Host computing system 102 is a physical computing system and is capable of executing machine readable instructions. In a preferred embodiment of the present invention, host computing system 102 is capable of hosting multiple logical partitions (LPARs) (also called virtual machines or virtual servers).

Host computing system 102 is divided into multiple virtual machines (VMs) 104, 106, and 108 through logical partitioning. In an exemplary embodiment, each of the respective VMs 104, 106, and 108 runs an independent, guest operating system (OS), for example, VM 104 runs OS 132, which can be the AIX® operating system, VM 106 runs OS 134, which can be the Virtual Input/Output Server (VIOS), and VM 108 runs OS 136, which can be the Linux® operating system. Other operating environments and combinations of operating environments may be used. In various embodiments of the present invention, any number of LPARs or VMs may be used.

Hypervisor 110 creates VMs 104, 106, and 108 from the physical resources of host computing system 102 through logical sharing of designated processors 112, storage disks 114, network cards 116, and/or memory 118 among logical partitions. Designated processors 112 consist of one or more processing cores 122. A processing core is a single microprocessor. Designated processors 112 can be single core processors or multicore processors in which there are multiple central processing units on a single microchip. Each processing core is made up of one or more subcores. Subcores are the smallest processing unit able to execute a thread of execution. A thread of execution is the smallest sequence of programmed instructions that can be managed independently by an operating system scheduler. Hypervisor 110 dynamically allocates designated processors 112 or cores 122, storage disks 114, network cards 116, and/or memory 118 in accordance with the workload requirements of each of VMs 104, 106, and 108. Additionally, hypervisor 110 performs standard operating system functions and manages communication between VMs 104, 106, and 108. Hypervisor 110 caches data requested by each VM of host computing system 102, so the data is available from the hypervisor's cache to all the VMs of the host computing system.

In an exemplary embodiment, hypervisor 110 contains DLPAR verification program 120. DLPAR verification program 120 may alternatively be stored on memory 118 of host computer system 102, or on external memory (not shown). DLPAR verification program 120 executes diagnostic steps to verify that when hypervisor 110 dynamically repartitions processors 112, such repartitioning will not result in a hardware failure. In various embodiments of the present invention, DLPAR verification program 120 runs to individually test the ability of each processing core 122 to dynamically change between logical partition modes.

Figure 2:
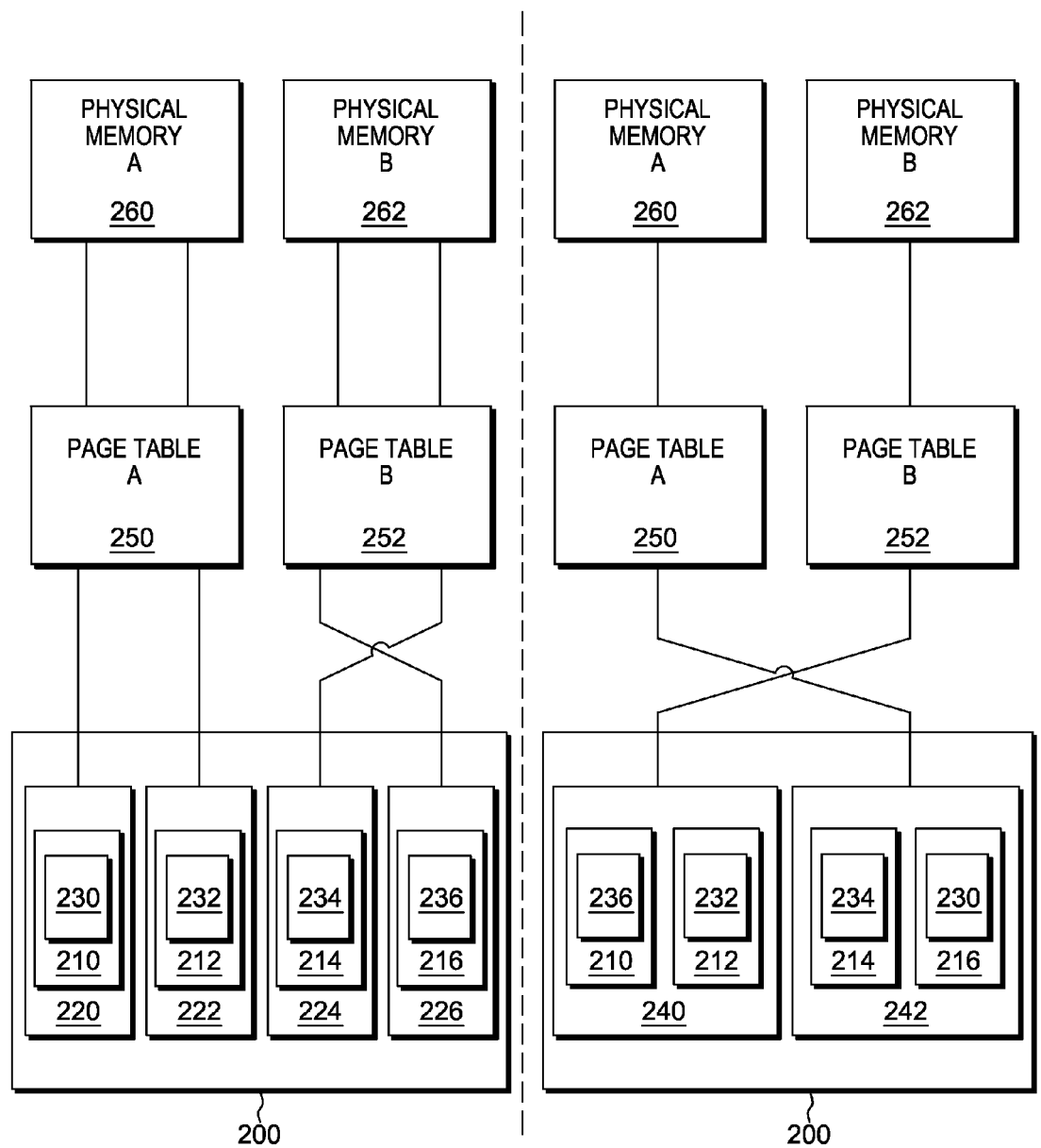
FIG. 2 depicts an exemplary transition of a single processor core containing four subcores from a state with four logical partitions to a state with two logical partitions including the remapping of the test cases generated in accordance with an embodiment of the present invention.

FIG. 2 depicts an exemplary transition between two LPAR states on a single processor core 200 having four subcores 210, 212, 214, and 216. The left configuration depicted in FIG. 2 shows a single core 200 divided into four logical partitions with each subcore occupying a single LPAR. The right configuration depicted in FIG. 2 shows the same core 200 as the left configuration of FIG. 2 after a DLPAR transition into a LPAR mode with two LPARs and two subcores occupying each LPAR.

Processor core 200 is a single core in a multicore processor. Within core 200 is at least one subcore. Each core may be logically partitioned to divide resources and/or processing capacity in a manner which may be assigned to a single VM. As depicted in FIG. 2, Core 200 contains four subcores 210, 212, 214, and 216. Subcores 210, 212, 214, and 216 are each capable of executing threads provided by processes host computing system 102 executes. Subcores 210, 212, 214, and 216 are physical resources contained in host computing system 102 and are, therefore, capable of being assigned to a LPAR by hypervisor 110. At any given point in time, the core is a "LPAR mode" which refers to the number of logical partitions into which the core is currently divided. For example, if the core is presently divided into two LPARs, then the core is in "2LPAR" mode. Likewise, if the core is presently divided into four LPARs, then the core is in "4LPAR" mode.

Prior to a change in LPAR mode, subcores 210, 212, 214, and 216 are each assigned to a different LPAR 220, 222, 224, and 226. Core 200 contains four subcores 210, 212, 214, and 216, which are assigned respectively to LPARs 220, 222, 224, and 226. Prior to a change in LPAR mode, Core 200 is in "4LPAR" mode because the single core is subdivided into four LPARs.

DLPAR verification program 120 loads test cases 230, 232, 234, and 236, which are executable threads, onto subcores 210, 212, 214, and 216 respectively. Each test case contains executable instructions which each subcore will execute. For example, a test case may instruct the subcore to read a particular memory element, copy that element to a new location, and execute a cyclic redundancy check comparing that memory element with a reference value contained in the test case. The test cases are meant to determine if the subcore is operating properly in the present LPAR mode. Test cases 230, 232, 234, and 236 may be "compatible" or "incompatible". Compatible test cases share certain resources. Incompatible test cases do not share those resources. For example, test cases may be written so that it requires reference to a particular page table. A compatible test case would also make reference to that same page table while an incompatible test case would require reference to a different page table. The resources to which a LPAR has access are part of the context and environment of that LPAR. According to an embodiment of the present invention, test cases 230 and 234 are compatible, and test cases 232 and 236 are compatible. Test cases 230 and 234 share page table 250. Test cases 232 and 236 share page table 252. Conversely, test cases 230 and 234 are incompatible with test cases 232 and 236.

Page tables 250 and 252 contain translation information. This translation information is used to convert a virtual memory address into a physical memory address. In an embodiment of the present invention, test cases 230, 232, 234, and 236 provide a call on a virtual memory address that is translated into a physical memory address by page tables 250 and 252. The physical addresses to which page tables 250 and 252 translate are found in physical memories 260 and 262 respectively. Once the data is collected from physical memory 260 and 262, it is returned to the subcore from which the call was made and can then be copied to a new location in the physical memory of host computing system 102.

In an exemplary embodiment of the present invention, DLPAR verification program 120 triggers a reconfiguration of the LPAR mode of processor core 200 that results in a reassignment of subcores 210, 212, 214, and 216 to different LPARs. DLPAR verification program 120 initiates the change in LPAR mode in order to ensure that the hardware comprising the LPAR continues to function properly after a change in LPAR mode. FIG. 2 depicts such a reassignment from a LPAR mode with four LPARs to a LPAR mode with two LPARs. The latter LPAR mode is called "2LPAR" mode. Core 200 is now divided into LPARs 240 and 242. LPAR 240 contains subcores 210 and 212. LPAR 242 contains subcores 214 and 216. LPAR 240 and 242 are now each connected to Page tables 252 and 250 respectively. Because each LPAR can only be connected to one page table, all of the test cases loaded onto subcores in any given LPAR must reference the same page table, or else the system reports an error. Therefore, in order to ensure that all test cases in the 2LPAR configuration on processor core 200 are compatible, the contexts of subcore 210 and 216 are swapped by DLPAR verification program 120. This transition results in test case 236 being loaded onto subcore 210 and test case 230 being loaded onto subcore 216.

Figure 3:
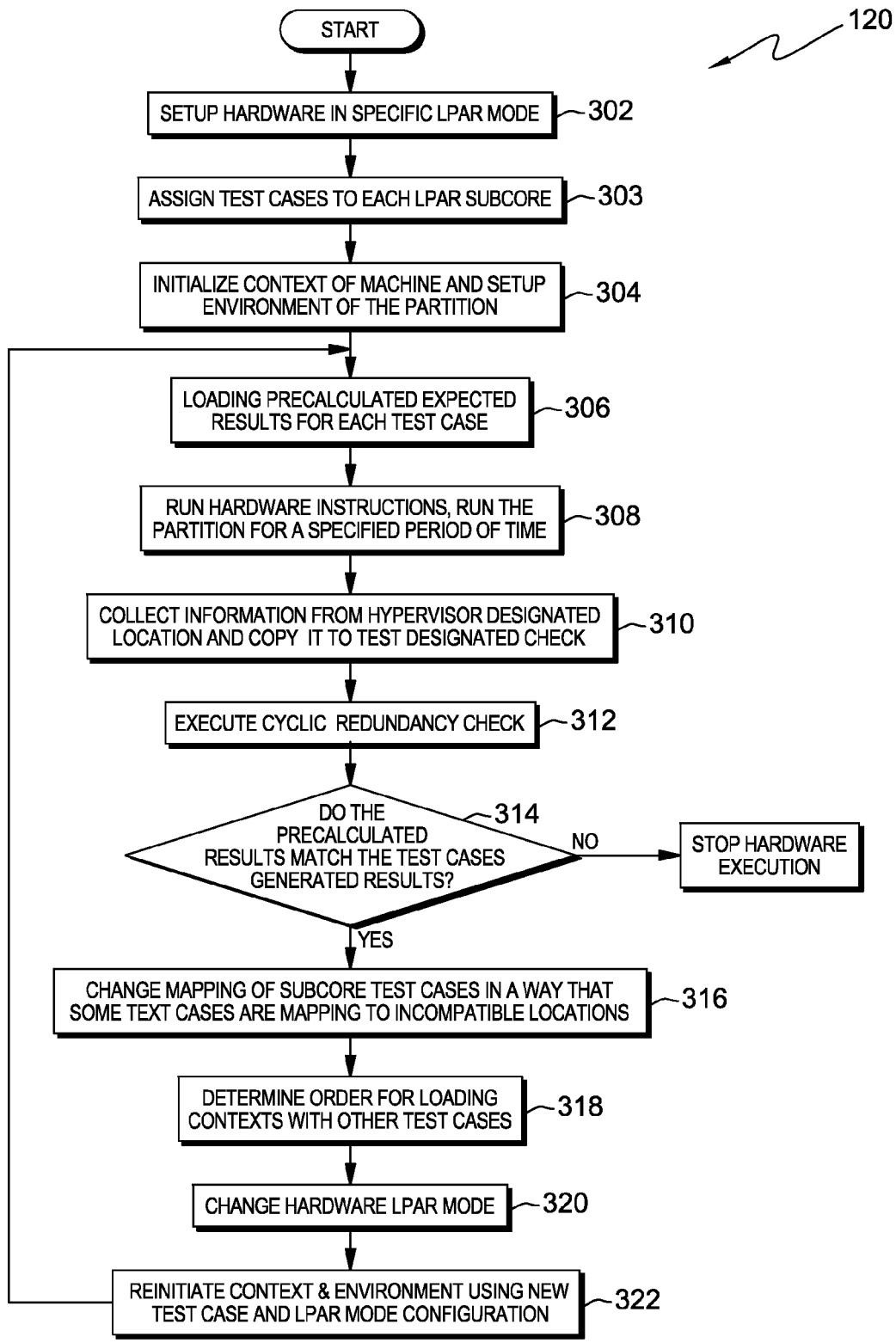
FIG. 3 is a flowchart illustrating operational steps of a DLPAR verification program, residing on a host computing system, for verifying that the server's dynamic logical partitioning capabilities are functioning properly.

FIG. 3 is a flowchart illustrating operational steps of DLPAR verification program 120, residing on host computer system 102, for testing the logical partition modes on processing cores 122, in accordance with an embodiment of the present invention. In an exemplary embodiment of the present invention DLPAR verification program 120 tests the LPAR modes on a single processor core 200, however, the invention is not limited to occurring on a single core.

DLPAR verification program 120 initializes the physical hardware of host computer system 102 in a predetermined LPAR mode (step 302). For example, DLPAR verification program logically partitions the subcores of core 200. DLPAR verification program 120 then assigns subcores 210, 212, 214, and 216 to particular LPARs. In an exemplary embodiment of the present invention, DLPAR verification program 120 receives initial LPAR mode instructions from a user defined input.

DLPAR verification program 120 generates and assigns test cases to each subcore on core 200 (step 303). Core 200 consists of a number of subcores 210, 212, 214, and 216, which execute discrete sequences of process instructions. In the exemplary embodiment of the present invention, DLPAR verification program 120 generates test cases 230, 232, 234, 236 that instruct subcores 210, 212, 214, and 216 to perform operations on the physical hardware of host computer system 102, for example, to read a particular memory element, copy that element to a predefined location, and compare that element to a predicted value using a cyclic redundancy check DLPAR verification program 120 initializes the context of the initial LPAR mode as well as the environment of each partition (step 304). The context of a LPAR mode comprises the minimal set of physical resources that the LPAR requires, which may include portions of disks 114, network cards 116, and/or memory 118. The environment of the LPAR is the complete set of hardware that the LPAR uses including all memory, page tables, and physical attributes of the host computer system 102.

DLPAR verification program 120 loads precalculated expected results for each test case on each subcore (step 306). The precalculated results are specific to the initial LPAR mode. The precalculated results consist of the expected data that will be retrieved from the specific memory location designated in the assigned test case. The precalculated results serve as a reference against the information actually returned by DLPAR verification program 120 when it executes the test case assigned to the subcore.

DLPAR verification program 120 runs the LPARs, which have been loaded with assigned test cases 230, 232, 234, and 236, for a designated period of time (step 308). The designated period of time is configurable and may be set by a user of host computer system 102. This period of time provides the LPARs with a time to execute the instructions contained in the test cases loaded onto each subcore.

DLPAR verification program 120 collects information from the memory location designated by the test case (e.g. 260) and copies it to a pre-allocated buffer defined by DLPAR verification program 120 (step 310). The pre-allocated buffer is a region of physical memory that is used to temporarily store the information copied from the location designated by the test case.

DLPAR verification program 120 executes a cyclic redundancy check (CRC) (step 312). The CRC compares the data stored in the pre-allocated buffer by the execution of the test case with the precalculated expected results that were loaded with the LPAR environment. A CRC is a well known error-detecting code that compares a previously generated check value on a piece of data with a presently generated check value to determine if they are the same. In the embodiment of the present invention, the precalculated expected result represents the previously generated check value, and the data stored in the pre-allocated buffer represents the presently generated check value. The CRC compares the previously generated check value with the presently generated check value and determines if they match.

DLPAR verification program 120 determines if the information collected by the test case executed by the subcore matches the precalculated expected results (decision block 314). If the information collected by the test case does not match the precalculated expected results, then an error is generated (decision block 314, no branch). In the exemplary embodiment of the present invention, the error results in the termination of hardware execution within host computer system 102.

If the information collected by the test case does match the precalculated expected results (decision block 314, yes branch) DLPAR verification program 120 remaps the test cases to the subcores in anticipation of a change to the LPAR mode (step 316).

DLPAR verification program 120 reassigns the test cases so that they are in an incompatible configuration in the present LPAR mode, but will be in a compatible configuration after the core reassigns the subcores to a new LPAR mode (step 316). As noted above, test cases may be categorized as compatible or incompatible. Compatible test cases are designed to share certain information such as physical memory 118, or page table references (e.g. 250 or 252), which is included in the environment and the context of the particular LPAR mode in which the core is operating. Incompatible test cases are designed so as not to share this information. For example, one test case may require reference to page table 250 while a second test case requires reference to page table 252. These two test cases are incompatible. Because incompatible test cases, by definition, require multiple contexts, and a LPAR may only have one context and environment, incompatible test cases cannot operate on subcores in a single LPAR.

DLPAR verification program 120 determines an order for loading the LPAR context in the anticipated new LPAR mode (step 318). Each subcore has its own context value that it will load when the LPAR context is loaded. The last subcore value that loads will overwrite the previous values and will be used by the LPAR. Therefore, DLPAR verification program 120 assigns an order in which each subcore will load its context so that the final subcore to load its context is the correct context for the entire partition.

DLPAR verification program 120 initiates a change in the hardware configuration of the core into a new LPAR mode (step 320). The allocation of physical resources of the core changes so that the subcores are reassigned to new LPARs.

DLPAR verification program 120 loads the contexts and environments for the newly reassigned test cases and new LPAR mode (step 322).

DLPAR verification program 120 returns to run the LPAR with the newly assigned test cases for a designated period of time (step 308). This loop can be run as many times, and through as many LPAR modes, as a user designates.

Figure 4:
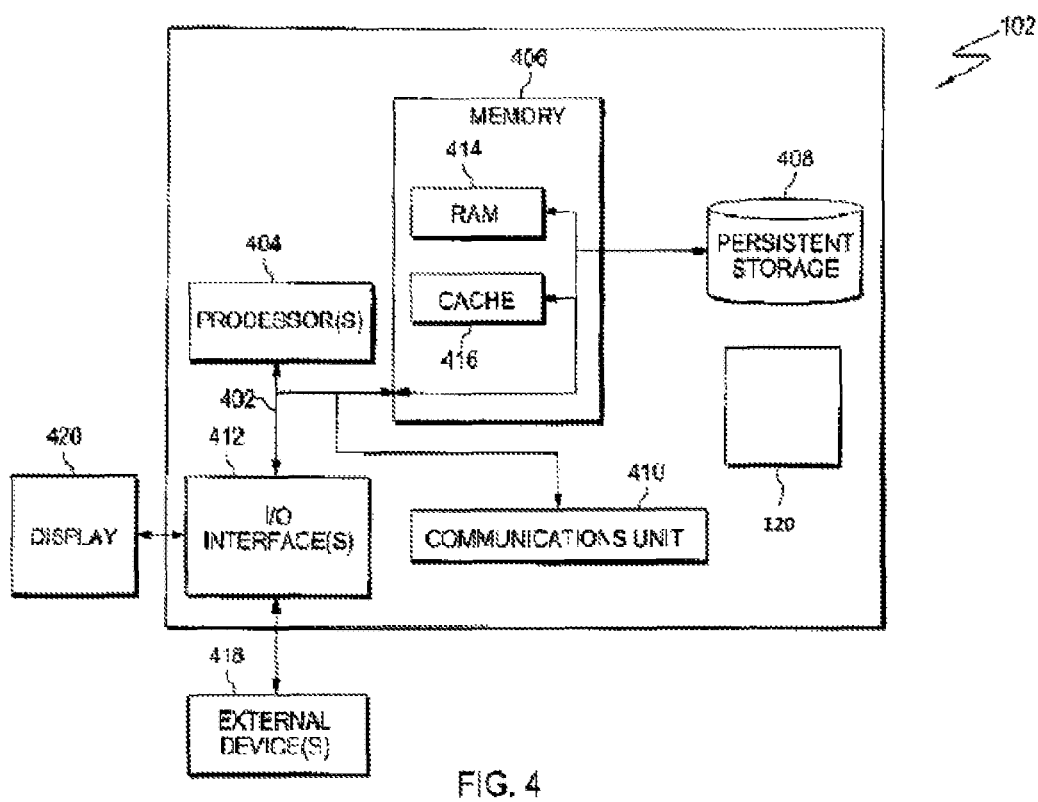
FIG. 4 depicts a block diagram of components of an exemplary computing system for implementing embodiments of the present invention.

FIG. 4 depicts a block diagram of components of host computing system 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Host computing system 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

DLPAR verification program 120 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. DLPAR verification program 120 may be downloaded to persistent storage 408 through communications unit 410.

I/O interface(s) 412 allows for input and output of data with other devices that may be connected to host computing system 102. For example, I/O interface(s) 412 may provide a connection to external devices 418 such as a keyboard, a keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., DLPAR verification program 120, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for verifying transitions between logical partition configurations, the method comprising:
   dividing physical resources of a processing core into a number of logical partitions, wherein each logical partition has an associated context comprising at least one processing subcore;
   assigning a test case to each processing subcore, wherein the assigned test case contains instructions for verifying the associated context of the respective logical partition to which the processing subcore belongs, and executing the assigned test cases;
   reassigning at least some of the test cases to different processing subcores prior to reconfiguring the physical resources of the processing core into a different number of logical partitions;
   reconfiguring the physical resources into the different number of logical partitions; and
   executing the test cases as assigned within the different number of logical partitions.

2. The method of claim 1, wherein the different number of logical partitions comprise greater number of logical partitions than the number of logical partitions.

3. The method of claim 1, wherein execution of an assigned test case comprises:
   collecting a predesignated memory element from a memory location associated with the logical partition comprising the processing subcore to which the assigned test case is assigned; and
   determining whether the collected memory element matches a precalculated reference value.

4. The method of claim 3, wherein determining whether the collected memory element matches the precalculated reference value is accomplished by a cyclic redundancy check.

5. The method of claim 1, wherein the different number of logical partitions comprises fewer logical partitions than the number of logical partitions.

6. The method of claim 5, wherein execution of an assigned test case comprises: loading associated context of a logical partition of the different number of logical partitions, wherein the assigned test case is assigned to a processing subcore within the logical partition; and
   determining whether loading the associated context of the logical partition results in a page fault.

7. The method of claim 1, further comprising:
   determining that the reconfiguration of the physical resources into the different number of logical partitions occurred without error;
   reassigning at least some of the test cases to different processing subcores in anticipation of reconfiguring the physical resources of the processing core into a second different number of logical partitions;
   reconfiguring the physical resources into the second different number of logical partitions; and
   executing the test cases as assigned within the second different number of logical partitions.

* * * * *